United States Patent Office 3,417,135
Patented Dec. 17, 1968

3,417,135
CONVERSION OF PYRIDINE TO
BENZOIC ACID
Louis Schmerling, Riverside, and Walter G. Toekelt,
Downers Grove, Ill., assignors to Universal Oil Products Company, Des Plaines, Ill., a corporation of
Delaware
No Drawing. Filed Sept. 1, 1964, Ser. No. 393,776
12 Claims. (Cl. 260—515)

ABSTRACT OF THE DISCLOSURE

Conversion of pyridine, or similar heterocyclic compounds characterized by an aromatic heterocyclic ring containing a tertiary amino nitrogen, to a carbocyclic aromatic carboxylic acid by reacting the heterocyclic compound with potassium acetate in the presence of an alkaline catalyst at a temperature of 150°–300° C., then hydrolyzing and acidifying the resultant product.

---

This invention relates to a novel process for the conversion of a heterocyclic aromatic nitrogen compound to a carbocyclic aromatic carboxylic acid. More specifically, this invention relates to a novel process for the conversion of pyridine to benzoic acid.

It is an object of this invention to present a one step process for the conversion of a heterocyclic aromatic nitrogen compound to a carbocyclic aromatic compound.

In one of its broad aspects this invention embodies a process for the conversion of a heterocyclic nitrogen compound characterized by an aromatic heterocyclic ring containing a tertiary amino nitrogen to a carbocyclic aromatic carboxylic acid, which process comprises reacting said nitrogen compound with an alkali metal acetate in the presence of a catalyst selected from the group consisting of alkali metals, alkali metal hydrides, alkali metal amides, alkali metal alkyls and alkali metal aryls at a temperature of from about 150° C. to about 300° C. and hydrolyzing and acidifying the product.

A further embodiment of this invention resides in a process for the conversion of a heterocyclic nitrogen compound characterized by an aromatic heterocyclic ring containing a tertiary amino nitrogen to a carbocyclic aromatic carboxylic acid, which process comprises reacting said nitrogen compound with potassium acetate in the presence of sodamide at a temperature of from about 150° C. to about 300° C. and hydrolizing and acidifying the product.

One specific embodiment of this invention relates to a process for the conversion of pyridine to benzoic acid which comprises reacting said pyridine with potassium acetate in the presence of sodamide at a temperature of from about 180° C. to about 250° C. and hydrolyzing and acidifying the product.

Other objects and embodiment of this invention will become apparent in the following detailed specification.

The heterocyclic nitrogen compounds which can be reacted with an alkali metal acetate in accordance with the process of this invention are characterized by an aromatic heterocyclic ring containing a tertiary amino nitrogen and include, for example, compounds such as pyridine, 2-methylpyridine, 3-methylpyridine, 4-methylpyridine, quinoline, isoquinoline, 2-methylquinoline, 3-methylquinoline, 4-methylquinoline, 6-methylquinoline, 7-methylquinoline, 8-methylquinoline, acridine, 3-methylacridine, phenanthridine, and the like.

Pursuant to the process of this invention, the heterocyclic nitrogen compound is reacted with an alkali metal acetate, e.g., sodium acetate, potassium acetate, lithium acetate, cesium acetate, and rubidium acetate, in the presence of a catalyst. Of the alkali metal acetates, potassium acetate is preferred.

Catalysts which can be employed in the present process comprise the alkali metals, hydrides and amides thereof, such catalysts including sodium, sodium hydride, sodamide, potassium, potassium hydride, potassium amide, lithium, lithium hydride, lithium amide, rubidium hydride, rubidium amide, cesium, cesium hydride, cesium amide, etc. Mixed hydrides such as lithium aluminum hydride and sodium borohydride may also be used. The catalysts may also comprise an alkali metal alkyl or aryl such as pentylsodium, butyllithium, or phenylpotassium, etc., and also an alkali metal derivative of an alkali metal salt of a saturated carboxylic acid or a mixture of the derivative and one of the catalysts hereinbefore set forth may be utilized although not necessarily with equivalent results. It is also contemplated within the scope of this invention to utilize the catalyst of this invention together with a promoter such as an aromatic hydrocarbon including benzene toluene, anthracene, etc., or an organic halide such as chlorobenzene, etc.

Generally speaking, the reaction between the alkali metal acetate and the heterocyclic nitrogen compound, said heterocyclic nitrogen compound being characterized by an aromatic heterocyclic ring containing a tertiary amino nitrogen, in the presence of a catalyst of the type hereinbefore set forth, is effected at a temperature in the range of from about 150° C. to about 300° C., and preferably at a temperature in the range of from about 180° C. to about 250° C., the particular temperature being dependent upon the reactants and the catalysts which are used. Pressure is not considered an important variable with respect to the reaction herein contemplated and may be simply autogenous pressure developed during the course of the reaction or an imposed pressure, utilizing an inert gas such as nitrogen, sufficient to maintain a substantial portion of the reactants in liquid phase, say from about 25 to about 200 atmospheres or more.

The process of this invention may be effected in a batch type of operation. For example, a quantity of the heterocyclic nitrogen compound, alkali metal acetate, and the selected catalyst, together with a promoter and/or diluent if any is used, is sealed in a suitable apparatus such as, for example, a rotating autoclave. The reaction vessel is brought to the desired initial pressure and heated to the desired temperature. After a predetermined period of time the autoclave and contents thereof are cooled to room temperature, the excess pressure is vented to the atmosphere and the reaction product is recovered by conventional means such as, for example, by dissolving the reaction product in water to hydrolyze said product thereby forming the salt of the desired carboxylic acid. The product may then be extracted with a suitable organic solvent such as ether to remove insoluble material, after which the aqueous solution is acidified by conventional means using acidifying agents such as inorganic acids including hydrochloric acid, sulfuric acid, nitric acid, etc., and the desired carbocyclic aromatic carboxylic acid recovered, one method consisting of extraction of the acid with a solvent such as ethyl ether, followed by fractionation of the extract.

The following examples are given to illustrate specific embodiments of the present invention and are not intended as a limitation of the generally broad scope of this invention as set out in the appended claims.

Example I

A mixture of 30 grams of potassium acetate, 50 grams of pyridine, 3 grams of sodamide and 1 gram of anthracene was placed in a glass liner of a rotating autoclave under 50 atmospheres initial nitrogen pressure and heated to a temperature of 250° C. over a 4.5 hour period, the pressure reaching a maximum of 115 atmospheres. At the expiration of this time the autoclave and contents were cooled to room temperature, the final pressure at room temperature being 48 atmospheres. The autoclave was vented to the atmosphere and the reaction mixture was recovered and treated with cold water, ether extracted, and the aqueous layer acidified with dilute hydrochloric acid and ether extracted. Distillation of the ether extract of the acidified aqueous layer at reduced pressure yielded 3 grams of residue which was evaporated to dryness over a steam bath. A brown crystalline residue was obtained. This was recrystallized from hot water yielding pure benzoic acid, the identity of which was established by melting and mixed melting points, carbon and hydrogen analysis, and infra-red and nuclear magnetic resonance spectroscopy.

Example II

Ten grams of a dispersion of sodium hydride in mineral oil comprising 53.6% sodium hydride was mixed with 50 grams of pyridine and 30 grams of potassium acetate and the mixture was placed in a glass liner of a rotating autoclave under 50 atmospheres initial ethylene pressure and heated to a temperature of 250° C. over a 4 hour period, the maximum pressure reaching 114 atmospheres. At the expiration of this time the autoclave and the contents were cooled to room temperature, the final pressure at room temperature being 50 atmospheres. The autoclave was vented to the atmosphere and the reaction mixture was recovered and treated with cold water, ether extracted, and the aqueous layer acidified with dilute hydrochloric acid and ether extracted. Distillation of the ether extract of the acidified aqueous layer yielded a residue which was evaporated to dryness over a steam bath and thereafter recrystallized from hot water yielding pure benzoic acid.

Example III

A mixture of 30 grams of potassium acetate, 50 grams of pyridine, 3 grams of sodium and 1 gram of anthracene was placed in a glass liner of a rotating autoclave under 45 atmospheres initial ethylene pressure and heated to a temperature of 250° C. over a 5 hour period, the pressure reaching a maximum of 99 atmospheres. At the expiration of this time the autoclave and contents were cooled to room temperature, the final pressure at room temperature being 44 atmospheres. The autoclave was vented to the atmosphere and the reaction mixture was recovered and treated with cold water, ether extracted, and the aqueous layer acidified with dilute hydrochloric acid and ether extracted. Distillation of the ether extract of the acidified aqueous layer yielded a residue which was evaporated to dryness over a steam bath. This residue was then recrystallized from hot water yielding pure benzoic acid.

Example IV

A mixture of 30 grams of potassium acetate, 50 grams of pyridine, 3 grams of potassium and 0.5 gram of anthracene was placed in a glass liner of a rotating autoclave under 30 atmospheres initial nitrogen pressure and heated to a temperature of 250° C. over a 4.5 hour period, the maximum pressure reaching 67 atmospheres. At the expiration of this time the autoclave and contents were cooled to room temperature, the final pressure at room temperature being 30 atmospheres. The autoclave was vented to the atmosphere and the reaction mixture was recovered and treated with water, ether extracted, and the aqueous layer acidified and ether extracted. Distillation of the ether extract of the acidified aqueous layer yielded a residue which was evaporated to dryness over a steam bath. This residue was recrystallized from hot water yielding pure benzoic acid.

Example V

A mixture of 32 grams of potassium acetate, 94 grams of pyridine, and 47 grams of a solution of 15.5% butyl-lithium in a pentane-heptane mixture (one-third pentane) was placed in a glass liner of a rotating autoclave under 50 atmospheres initial nitrogen pressure and heated to a temperature of 250° C. over a 4.5 hour period. At the expiration of this time the autoclave and contents were cooled to room temperature. The autoclave was vented to the atmosphere and the reaction mixture was recovered and treated with water, ether extracted, and the aqueous layer acidified and ether extracted. Distillation of the ether extract of the acidified aqueous layer yielded 4.5 grams of residue from which pure benzoic acid was obtained by recrystallization from hot water.

We claim as our invention:

1. A process for the conversion of a heterocyclic nitrogen compound characterized by an aromatic heterocyclic ring containing a tertiary amino nitrogen to a carbocyclic aromatic carboxylic acid, said nitrogen compound being an unsubstituted or lower alkyl substituted compound selected from the group consisting of pyridine, quinoline, isoquinoline, acridine and phenanthridine, which process comprises reacting said nitrogen compound with an alkali metal acetate in the presence of a catalyst selected from the group consisting of alkali metals, alkali metal hydrides, alkali metal amides, alkali metal alkyls and alkali metal aryls at a temperature of from about 150° C. to about 300° C. and hydrolyzing and acidifying the resultant product.

2. A process for the conversion of a heterocyclic nitrogen compound characterized by an aromatic heterocyclic ring containing a tertiary amino nitrogen to a carbocyclic aromatic carboxylic acid, said nitrogen compound being an unsubstituted or lower alkyl substituted compound selected from the group consisting of pyridine, quinoline, isoquinoline, acridine and phenanthridine, which process comprises reacting said nitrogen compound with potassium acetate in the presence of a catalyst selected from the group consisting of alkali metals, alkali metal hydrides, alkali metal amides, alkali metal alkyls and alkali metal aryls at a temperature of from about 150° C. to about 300° C. and hydrolyzing the resultant carboxylic acid salt.

3. A process for the conversion of a heterocyclic nitrogen compound characterized by an aromatic heterocyclic ring containing a tertiary amino nitrogen, to a carbocyclic aromatic carboxylic acid, said nitrogen compound being an unsubstituted or lower alkyl substituted compound selected from the group consisting of pyridine, quinoline, isoquinoline, acridine and phenanthridine, which process comprises reacting said nitrogen compound with potassium acetate in the presence of sodium at a temperature of from about 150° C. to about 300° C. and hydrolizing and acidifying the resultant product.

4. A process for the conversion of a heterocyclic nitrogen compound characterized by an aromatic heterocyclic ring containing a tertiary amino nitrogen to a carbocyclic aromatic carboxylic acid, said nitrogen compound being an unsubstituted or lower alkyl substituted compound selected from the group consisting of pyridine, quinoline, isoquinoline, acridine and phenanthridine, which process comprises reacting said nitrogen compound with potassium acetate in the presence of potassium at a temperature of from about 150° C. to about 300° C. and hydrolyzing and acidifying the resultant product.

5. A process for the conversion of a heterocyclic nitrogen compound characterized by an aromatic heterocyclic ring containing a tertiary amino nitrogen to a carbocyclic aromatic carboxylic acid, said nitrogen compound being an unsubstituted or lower alkyl substituted compound selected from the group consisting of pyridine, quinoline, isoquinoline, acridine and phenanthridine, which process comprises reacting said nitrogen compound with potassium acetate in the presence of sodamide at a temperature of from about 150° C. to about 300° C. and hydrolyzing and acidifying the resultant product.

6. A process for the conversion of a heterocyclic nitrogen compound characterized by an aromatic heterocyclic ring containing a tertiary amino nitrogen to a carbocyclic aromatic carboxylic acid, said nitrogen compound being an unsubstituted or lower alkyl substituted compound selected from the group consisting of pyridine, quinoline, isoquinoline, acridine and phenanthridine, which process comprises reacting said nitrogen compound with potassium acetate in the presence of sodium hydride at a temperature of from about 150° C. to about 300° C. and hydrolyzing and acidifying the resultant product.

7. A process for the conversion of a heterocyclic nitrogen compound characterized by an aromatic heterocyclic ring containing a tertiary amino nitrogen to a carbocyclic aromatic carboxylic acid, said nitrogen compound being an unsubstituted or lower alkyl substituted compound selected from the group consisting of pyridine, quinoline, isoquinoline, acridine and phenanthridine, which process comprises reacting said nitrogen compound with potassium acetate in the presence of butyllithium at a temperature of from about 150° C. to about 300° C. and hydrolyzing and acidifying the resultant product.

8. A process for the conversion of pyridine to benzoic acid which comprises reacting said pyridine with potassium acetate in the presence of sodium at a temperature of from about 180° C. to about 250° C. and hydrolyzing and acidifying the product.

9. A process for the conversion of pyridine to benzoic acid which comprises reacting said pyridine with potassium acetate in the presence of potassium at a temperature of from about 180° C. to about 250° C. and hydrolyzing and acidifying the product.

10. A process for the conversion of pyridine to benzoic acid which comprises reacting said pyridine with potassium acetate in the presence of sodamide at a temperature of from about 180° C. to about 250° C. and hydrolyzing and acidifying the product.

11. A process for the conversion of pyridine to benzoic acid which comprises reacting said pyridine with potassium acetate in the presence of sodium hydride at a temperature of from about 180° C. to about 250° C. and hydrolyzing and acidifying the product.

12. A process for the conversion of pyridine to benzoic acid which comprises reacting said pyridine with potassium acetate in the presence of butyllithium at a temperature of from about 180° C. to about 250° C. and hydrolizing and acidifying the product.

References Cited

Schmerling, Louis, et al.: Journal American Chemical Society, vol. 86, p. 1259 (1964).

LORRAINE A. WEINBERGER, *Primary Examiner.*

M. G. BERGER, *Assistant Examiner.*